United States Patent [19]

Dudonis et al.

[11] 4,031,325
[45] June 21, 1977

[54] CALLED PARTY FRAUD PREVENTION IN AN AUTOMATED COIN SYSTEM

[75] Inventors: Ronald Michael Dudonis, Englishtown; Charles Glenn Morrison, Holmdel, both of N.J.; Robert Lawrence Potter, Naperville, Ill.; Kenneth Streisand, East Brunswick, N.J.

[73] Assignee: Bell Telephone Laboratories, Incorporated, Murray Hill, N.J.

[22] Filed: June 21, 1976

[21] Appl. No.: 698,186

[52] U.S. Cl. .................... 179/6.3 R; 179/18 DA
[51] Int. Cl.² .................................... H04M 15/18
[58] Field of Search .............. 179/6.3 R, 6.31, 6.4, 179/6.5, 7.1 R, 2 DP, 84 VF, 18 DA

[56] References Cited

UNITED STATES PATENTS

| | | | |
|---|---|---|---|
| 2,676,209 | 4/1954 | Joel, Jr. | 179/6.3 R |
| 2,761,900 | 9/1956 | Joel, Jr. | 179/6.3 R |
| 3,069,502 | 12/1962 | Edstrom et al. | 179/6.3 R |
| 3,428,751 | 2/1969 | Edington | 179/6.3 R |
| 3,453,389 | 7/1969 | Shaer | 179/7.1 R |
| 3,484,560 | 12/1969 | Jaeger, Jr. et al. | 179/27 |
| 3,952,160 | 4/1976 | Pasternack et al. | 179/7.1 R |
| 4,001,513 | 1/1977 | Naylor | 179/7 R |

Primary Examiner—Kathleen H. Claffy
Assistant Examiner—Gerald L. Brigance
Attorney, Agent, or Firm—Martin S. Landis

[57] ABSTRACT

This invention pertains to systems servicing coin operated telephones and, more specifically, to apparatus in such systems for preventing called party fraud in simulating coin deposit signals. During intermediate coin deposit periods, the network connection between the calling and called stations is split into calling and called portions and then these portions are extended and reconnected. A filter is inserted in the extended called station portion to attenuate fraudulent coin deposit signals originating from the called station. A coin tone detector connected to the extended calling station portion is still actuated by valid coin deposit signals from the calling station, but does not detect the attenuated fraudulent signals.

16 Claims, 6 Drawing Figures

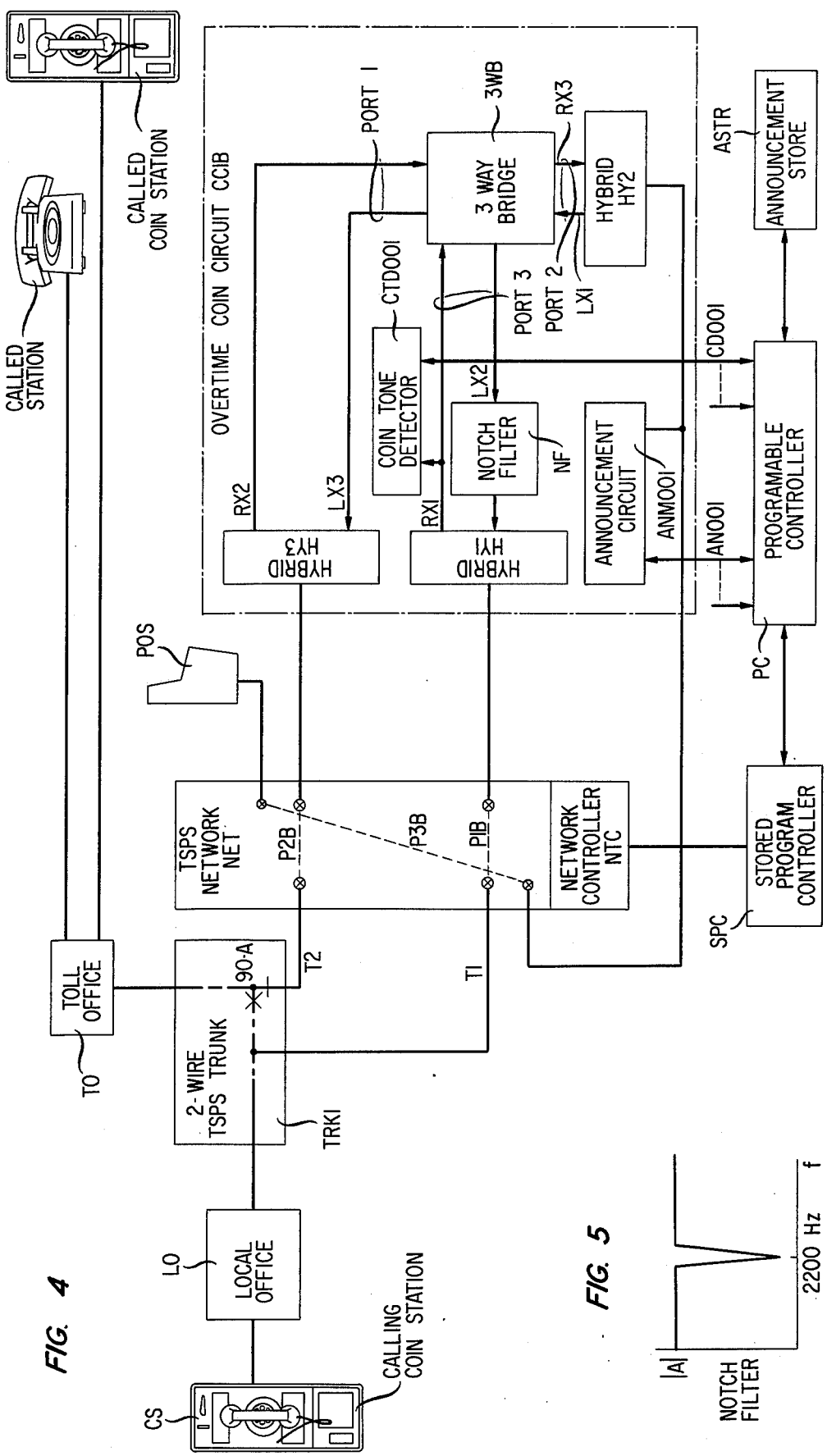

CALLED PARTY FRAUD PREVENTION IN AN AUTOMATED COIN SYSTEM

FIELD OF THE INVENTION

This invention relates to systems operable with coin telephones and, more specifically, to apparatus for preventing the detection of coin deposit signals associated with the called station.

BACKGROUND OF THE INVENTION AND PRIOR ART

An essential part of each coin operated telephone is apparatus responsive to the deposit of a coin for generating signals indicative of the value of the deposit. In one prior art coin telephone, each deposited coin strikes a distinctive gong or a chime. The sound generated thereby is converted to an electrical signal by a transducer and applied to the telephone line. An operator interprets the various sounds to determine the value of the deposited coins.

In another prior art coin operated telephone station, a switching device is included which operates one or more times in response to the deposit of each coin. Each switch operation is indicative of an incremental coin value such as five cents. Each operation of the switch energizes an oscillator that generates an electrical signal burst in the audible frequency range. These bursts are counted by the operator to determine the value of the coin deposited. A system of this type is disclosed in E. R. Andregg et al. U.S. Pat. No. 3,146,312, issued Aug. 25, 1964.

Operators working with the above-described coin identification systems are sometimes confused as to whether signals generated at a TOUCH-TONE signal dial are dial signals or coin deposit signals. Unfortunately, certain telephone users attempt to fool the operator into thinking that the requisite coins have been deposited by depressing certain combinations of the pushbuttons to generate series of single frequency tones.

J. E. Edington U.S. Pat. No. 3,428,751, issued Feb. 18, 1969, discloses one prior art arrangement that allows the operator to distinguish dial signals from coin deposit signals. In the Edington arrangement, a distinctive single frequency guard tone is provided at the termination of each dial signal. Thus, if an operator hears this guard tone, he or she then realizes that the preceding tone was generated from the pushbuttons rather than from the deposit of coins. The Edington arrangement appears to be effective in preventing the use of a TOUCH-TONE signaling dial to generate coin deposit signals.

Other prior art arrangements have attempted to automate the coin deposit detection functions normally performed by the operator. These systems are predicated on the theory that tone detectors responsive to specific frequency tones are more accurate in detecting coin deposit tones then an operator and therefore such detectors are less susceptible to fraudulently generated coin signals.

One such automated prior art system is disclosed in A. E. Joel Jr. U.S. Pat. No. 2,676,209, issued Apr. 21, 1954. In this system, each coin station includes signal generators controlled by coin deposits for generating transmitted combinations of two frequencies which identify the type of coin deposited, i.e, a nickel, a dime, or a quarter. These distinctive frequency combinations were detected by a tone detector and when the requisite coins were deposited, the call was completed without operator intervention.

Another fully automated prior art coin system is disclosed in N. R. Shaer U.S. Pat. No. 3,453,389, issued July 1, 1969. The Shaer system is incorporated in a larger partially automated traffic service position system (TSPS) disclosed in R. J. Jaeger, Jr. et al. U.S. Pat. No. 3,484,560, issued Dec. 16, 1966. This TSPS is hereinafter described in greater detail in conjunction with the present invention.

In the Shaer system the coin stations were modified as disclosed in the above-mentioned E. R. Andregg et al. patent. Now a number of tone pulses were generated for each deposited coin. One tone pulse was generated for a deposit for a nickel, two pulses for a dime, and five pulses for a quarter. Coin tone receivers were provided for detecting these series of tone pulses to identify the coin deposited in the coin station. When the requisite deposit was detected, the call was completed without operator intervention.

In still another prior art automated coin system as disclosed in copending application Ser. No. 689,600, filed May 24, 1976 by R. M. Dudonis (entitled Automated Coin Arrangement Provided Interference Free Coin Deposit Detection During Announcements), voice and other coin deposit signals received from a calling coin station are segregated from the automated announcements applied to the calling coin station. Thus, the coin tone detector can detect coin deposit tones even during announcements without any interference therewith.

All the above-mentioned prior art arrangements provide varying amounts of protection against fraud perpetrated by a subscriber at the calling coin station. Many of these arrangements are highly effective in preventing or a least indicating the existence of fraudulently generated coin deposit signals during the initial coin deposit period in which an initial deposit is deposited prior to or during the completion of the requested connection. However, all the above arrangements are susceptible in the varying extents to coin deposit signals fraudulently generated by the called station during intermediate coin deposit intervals. These intermediate coin deposit intervals are those deposit intervals in which both called and calling stations are connected together. More specifically, if the call is directed from a calling coin station to a called coin station, then coins deposited in the called coin station during intermediate coin deposit intervals may generate the same coin deposit signals as coins deposited in the calling coin station. Prior art detection equipment or an operator cannot distinguish between called station generated coin deposit signals and calling station generated coin deposit signals. Since coins can only be collected in the calling coin station, any coins deposited in the called coin station will not be collected and, accordingly, can be easily recovered by the called subscriber. Thus, the called subscriber has fraudulently derived free telephone service.

Moreover, in calls directed from a calling coin station to a regular called station, coin deposit signals can be acoustically coupled through the called station to the receiving apparatus to simulate valid coin deposit signals. Thus, apparently valid coin deposit signals can be generated at the called station and applied over the network connection during intermediate coin collection intervals to derive free use of the telephone network in these prior art systems.

It is an object of our invention to prevent fraudulently generated coin deposit signals emanating at a called station from being detected as valid coin deposit signals.

It is a further object of our invention to prevent called party fraud in automated systems for detecting coin deposit signals.

SUMMARY OF THE INVENTION

In accordance with the principles of our invention, during intermediate coin deposit intervals, the network connection between the calling coin and called stations is split creating a calling station portion and a called station portion. These portions are extended and reconnected with a coin tone detector connected to the extended calling station portion and with a filter inserted in the extended called station portion. This filter distorts and severely attenuates a particular frequency component present in coin deposit signals. Thus, valid coin deposit signals emanating from the calling station are detected by the coin tone detector while fraudulent coin deposit signals emanating from the called station are distorted by the filter and therefore are not detected as coin deposit signals by the coin tone detector.

More specifically, one illustrative embodiment of our invention is an improvement on the structure in the above-mentioned Dudonis application which, in turn, is incorporated in the above-mentioned TSPS system. During intermediate (or overtime) coin deposit periods, a TSPS trunk is split creating a calling station portion and a called station portion. Each of these portions is further connected by the TSPS network to an "overtime" coin circuit including a filter and a coin detector. The filter is inserted in the extended called station portion, the coin tone detector is connected to the extended calling station portion, and the extended portions are connected together in the coin circuit so that the calling and called parties may converse during these deposit periods. The filter attenuates a coin deposit frequency so that fraudulent coin deposit signals from the called station will not be detected by the coin tone detector.

In another illustrative embodiment of our invention, the overtime coin circuit includes two hybrid circuits for segregating the signals received from the calling and called stations. The coin tone detector is connected to the segregated path applying signals received from the calling coin station and detects coin deposit signals generated at the calling coin station. A filter is inserted in the segregated path applying signals received from the called station to attenuate a particular coin deposit frequency. Any signals from the called station which echo back to the coin circuit from the local office (and appear as though they were generated by the calling station) will not be detected by the coin tone detector since such signals will be attenuated at the particular coin deposit frequency.

In another illustrative embodiment, the overtime coin circuit includes a three-way bridge for interconnecting the calling station, the called station and an automated announcement circuit. Utilizing this bridge, the calling and called station may still communicate with eah other during such intermediate coin deposit intervals. Because of normal loop impedance mismatches, a portion of the voice or other signals generated by the called station may echo back to the coin circuit from the local office serving the calling coin station. Such echoes may be detected as valid coin deposit signals from the calling station whereas they actually originated at the called station. A filter is inserted in one of the paths in the overtime coin circuit to attenuate all signals at a specific coin deposit frequency. Thus, any echoes coming back to the coin circuit from the local office will be attenuated at this particular frequency and, accordingly, will not be detected as valid coin deposit signals.

Thus, in accordance with one feature of our invention, during intermediate coin deposit intervals, the network connection between the stations is split into two portions and extended. A filter inserted in the extended called station portion attenuates a specific coin deposit frequency preventing the detection and registration by a coin tone detector of coin deposit signals from the called station.

In accordance with another feature of our invention, the signals from the called and calling stations are segregated. A filter is inserted in the segregated path applying signals from the calling station while a coin tone detector is connected to the segregated path applying signals from the called station. Thus, called station generated signals which echo back to the coin tone detector from the local office or other sources of impedance mismatches will not be detected by the coin tone detector since such signals were attenuated at a particular coin tone frequency by the filter.

In accordance with another feature of our invention, the network connection between the calling and called stations is split during intermediate coin deposit intervals and reconnected in a bridge circuit which separates signals received from the calling and called stations. A coin tone detector and a filter both associated with the bridge circuit are connected so that the detector will only detect coin tones emanating from the calling coin station.

This invention although described herein in a coin telephone system is also beneficially applicable to other systems in which first and second stations are interconnected by a communication path and communicate thereover and in which specific signals are normally received by a receiver (connected to the path but physically disassociated from the stations) from one of the stations but such specific signals may be fraudulently or inadvertently received from the other station. By splitting the path and extending the split portions to a signal detector and signal distorter, valid signals can be detected while fraudulent signals are beneficially distorted and thereby ignored.

BRIEF DESCRIPTION OF THE DRAWING

The foregoing as well as other objects, features and advantages of the invention will be more apparent from a description of the drawing in which:

FIG. 4 illustrates still another illustrative coin circuit operable in accordance with the principles of our invention;

FIG. 5 illustrates how the notch filter in FIGS. 2, 3 and 4 attenuates the 2200 hertz component of signals from the called station.

A. PRIOR ART

Figure 1:
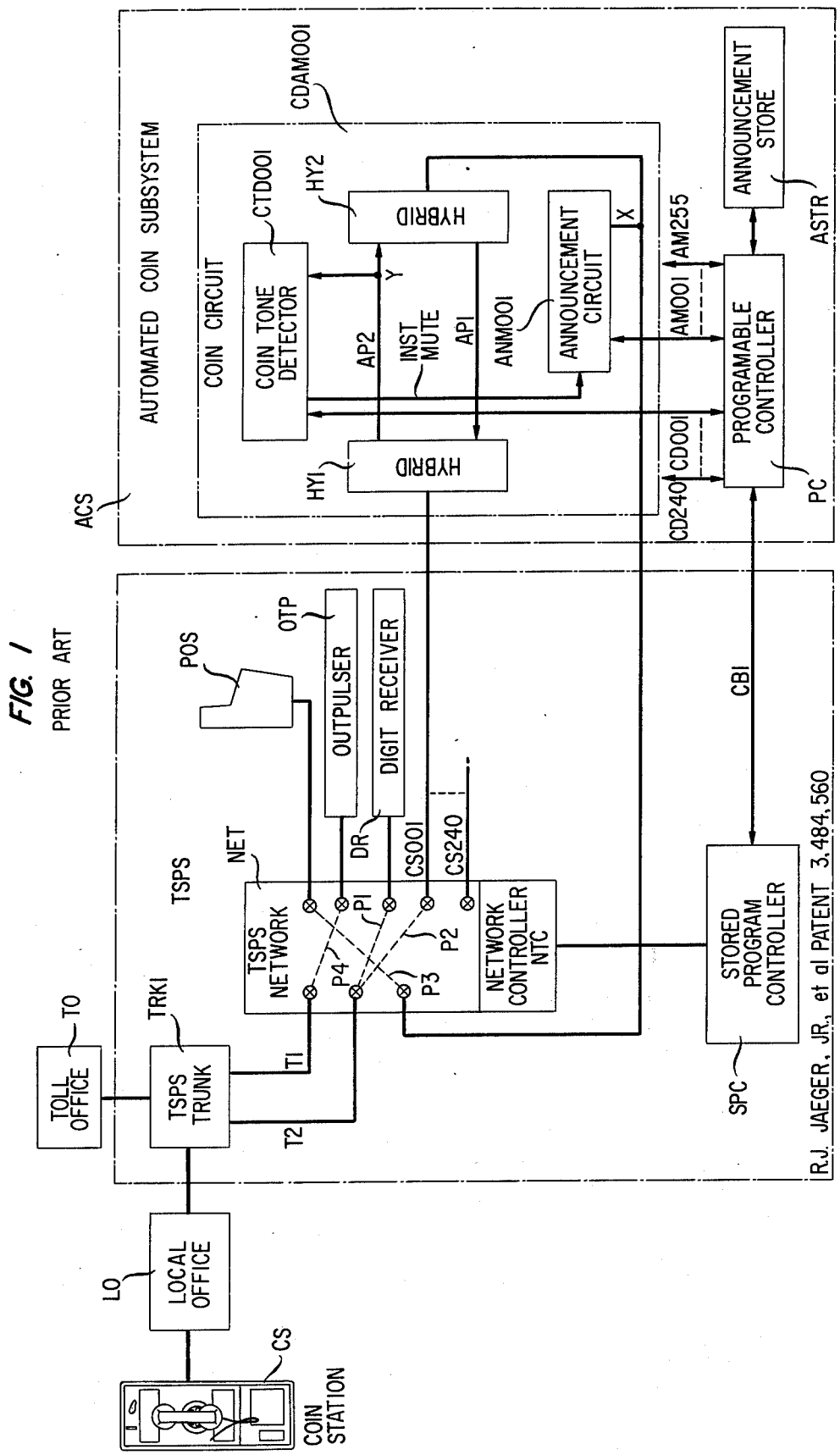
FIG. 1 illustrates in block diagram form the manner in which a prior art automated coin subsystem (described in the above-mentioned Dudonis application) is added to an existing Traffic Service Position System (TSPS)

FIG. 1 illustrates in block diagram form the manner in which a prior art automated coin subsystem ACS is added to an existing TSPS office to automate calls from coin stations. The TSPS is comprehensively described in R. J. Jaeger, Jr. et al U.S. Pat. No. 3,484,560, issued Dec. 16, 1966, and also in the Dec. 1970 issue of the *Bell System Technical Journal*.

PRIOR ART TSPS SYSTEM

With the advent of TSPS, many of the functions previously performed by an operator at a cordboard were automated. More specifically, a customer at a coin station CS would make an initial deposit and then dial a 1 followed by 7 or 10 digits. The local office LO routes the call to a TSPS trunk TRK1 and down conductors T1 to the TSPS network NET. Stored program controller SPC which is a duplicated processing unit for performing arithmetical and logical functions on data in accordance with its stored program, controls network controller NTC to establish connection P1. The local office transmits the calling and called digits to digit receiver DR via conductor T1 in the normal manner. The TSPS rates the call and displays the charge and initial period to an operator at a position such as position POS. A new network connection is then established between conductors T1 and position POS by TSPS network NET. While the operator at position POS informs the calling party of the requisite coin deposit, outpulser OTP is controlled by the SPC to outpulse the digits in the called number via path P4 and conductors T2 to toll office TO. When the calling subscriber deposits coins at station CS, distinctive tones are generated thereat indicating the type of coin deposit, i.e., nickel, dime, quarter. While the customer is depositing the coins and while the operator is listening for the coin deposit tones, the toll office TO establishes the call to the called station in the normal manner. When outpulsing to the toll office is completed the call is cut through by trunk TRK1 directly from the local office LO to the toll office TO.

At the end of the initial period, TSPS trunk TRK1 is connected via conductors T1 back to an operator's position POS (or any other idle position). The operator during this intermediate deposit period then informs both parties that the initial period has ended and to signal at the end of the call. The operator's position is then released and the call is again directly routed via trunk TRK1. If the subscribers do not go on-hook after the last announcement, then the call continues. The operator is again reconnected to the calling station via conductors T1 at the end of the call and requests additional overtime charges and then listens for the deposit of additional coins at coin station CS. If a long period of time elapses, the operator may be reconnected to collect further deposits during intermediate coin deposit periods before allowing the call to continue. During these deposit intervals the operator is not able to distinguish between valid coin deposit signals from the calling station and fraudulent coin deposit signals from the called station.

PRIOR ART AUTOMATED COIN SUBSYSTEM

Automated coin subsystem ACS in FIG. 1 is a prior art subsystem (described in the above-mentioned Dudonis application) operable to perform all operator functions previously described on coin paid station-to-station toll calls. In ACS, announcements to the customer are provided by announcement circuits such as ANM001 and coin deposits are automatically detected by coin tone detectors such as CTD001. To elaborate, ACS includes up to 240 coin circuits CDAM001-CDAM240. FIG. 1 only illustrates one coin circuit CDAM001; however, numerous others of these coin circuits are provided in accordance with normal traffic engineering principles.

The following will describe how ACS handles a typical coin paid toll call. The customer at coin station CS makes an initial deposit and then dials the call in the same manner previously described. Local office LO routes the call to TSPS and outpulses the calling and called digits which are received at the TSPS in digit receiver DR via path P1 from the T1 conductors. The SPC rates the call and instead of selecting an idle operator position, it selects an idle coin circuit CDAM001, for example. The SPC controls controller NTC to establish connection P2 from the T1 conductors to leads CS001. SPC then sends a command including the identity of the chosen coin circuit, the call charge and the initial period to programmable controller PC via cable CB1. Controller PC comprises self-checked, duplicated microprocessors. Responsive to this information from the SPC, programmable controller PC accesses the appropriate memory locations in announcement store ASTR and applies the digital binary bit information representing digitized speech retrieved from store ASTR in serial to announcement circuit ANM001 via lead AM001. Circuit ANM001 includes a digital-to-analog converter for converting the serial binary information into audible speech. The announcement requesting the appropriate deposit and initial time period (e.g., "Please deposit 60 cents for the first three minutes") is applied to the calling subscriber via point X, hybrid HY2, path AP1, hybrid HY1, leads CS001, P2, conductors T1, and local office LO to station CS.

Responsive to the received announcement, the calling subscriber begins to deposit coins in station CS. Station CS generates dual frequency, in-band tones for each coin deposited and indicates the amount of the deposited coin by generating a sequence of one or more tone pulses; for example, a single dual-frequency pulse is generated for each nickel deposited, while two such pulses are generated for each dime deposited, and five such pulses are generated for each quarter deposited. These tones are received over conductors T1, network connection P2, leads CS001, hybrid HY1, and path AP2 by coin tone detector CTD001. This detector comprises means for detecting the joint presence of the two distinct frequencies and for counting the number of pulses thereby indicating the amount of each coin deposit in five-cent increments. Coin tone detector CTD001 is periodically scanned by programmable controller PC over lead CD001 and receives any coin deposit detection information therefrom. For each coin deposited, programmable controller PC updates its temporary memory for that detector and determines whether the requested deposit has been made and if not, waits for additional coins to be deposited. As explained hereinafter, if the coins deposited are not sufficient, then the programmable controller PC accesses store ASTR and applies another announcement message or a prompt (e.g., "Please deposit 30 cents more.") to the calling subscriber via announcement circuit ANM001.

Coin tone detector CTD001 and announcement circuit ANM001 are segregated through the use of two hybrid transformers HY1 and HY2 and paths AP1 and AP2. This segregation allows the detection of coin deposits during announcements and, at the same time, prevents the announcement circuits from inadvertently tripping the coin tone detectors. Moreover, if the calling subscriber does not properly respond to the recorded announcements, then an operator is connected to the call via the TSPS trunk side termination of hybrid HY2, and detector CTD001 assists the operator in detecting valid coin deposits. For example, connection P3 is established from hybrid HY2 to position POS. The operator can then speak to the calling station without inadvertently tripping the coin tone detector CDT001 because the operator's voice is applied to the calling station via path AP1 (and not AP2). Moreover, coin tone detector CTD001 is still connected to the call and can help the operator detect the deposit of coins. Detector CTD001 is believed to be more accurate in detecting valid coin deposit tones than is the operator. Sometimes the operator can be fooled into thinking that coins have been deposited by the subscriber hitting combinations of selected multifrequency signalling tones. Detector CTD001 is sensitive to the actual frequencies of the received tones.

Normally operator intervention will not be required on coin deposit station-to-station toll calls. When programmable controller PC determines that the proper deposit has been made, it reports this to the SPC via cable CB1. The ACS is then disconnected from the call. The SPC then controls outpulser OTP to outpulse the called number via network connections P4 and conductors T2 to toll office T0. When the outpulsing is completed, the call is cut directly through TSPS trunk TRK1, and the TSPS then releases.

At the end of the initial period, network connection P2 is established from conductors T1 of trunk TRK1 to coin circuit CDAM001 and the SPC commands ACS to make a notify announcement. The appropriate storage locations are accessed in memory ASTR and an announcement (e.g., "Three minutes has ended. Please signal when through.") is applied to the calling subscriber by announcement circuit ANM001 via the two hybrids, path AP1 and network connection P2. After ACS makes the announcement, TSPS disconnects the coin circuit from the call and the subscriber conversation continues.

If the call continues beyond the initial period, a coin circuit such as CDAM001 is connected at the end of the call to conductors T1 under control of the SPC. Coin circuit CDAM001 is controlled by controller PC under instructions from the SPC to request the overtime charges (e.g., "Please deposit one dollar and sixty cents for the past 20 minutes") and detector CTD001 monitors the coin deposits, but may detect and register coin deposit signals from the called station since both the calling and called stations are connected together in trunk TRK1 and also connected to the coin circuit over the T1 conductors. Thus, detector CTD001 is still susceptible to called party fraud. When the required deposit is detected, the SPC is again notified and operates to disconnect ACS from the call.

ACS is also utilized to provide notification on other coin and noncoin calls and also provides time and charges quotations on calls other than coin paid calls. For more information pertaining to ACS, the above-mentioned Dudonis application can be consulted.

B. GENERAL DESCRIPTION OF SEVERAL ILLUSTRATIVE EMBODIMENTS OF THE INVENTION

The preceding has described how a prior art automated subsystem disclosed in the above-mentioned Dudonis application was incorporated in an existing TSPS to provide automated coin service for most calls. The coin circuit CDAM001 in FIG. 1 is highly effective in detecting coin deposit signals during announcements and in discriminating between multifrequency tones and coin deposit signals. However in the prior art system, during intermediate coin deposit periods, both the called station and the calling coin station circuits are interconnected by TSPS trunk TRK1 and further connected via the T1 leads to coin circuit CDAM001 in FIG. 1. The coin circuit cannot differentiate between coin signals emanating from the calling station and coin signals emanating from the called station, and therefore is susceptible to called party fraud.

In accordance with a feature of our invention, during intermediate coin deposit intervals, TSPS trunk TRK1 is split and the calling station is connected to the T1 leads while the called station is connected to the T2 leads. As mentioned previously in the TSPS system, the T2 leads were only utilized for outpulsing the called station number during the initial coin deposit.

Figure 2:
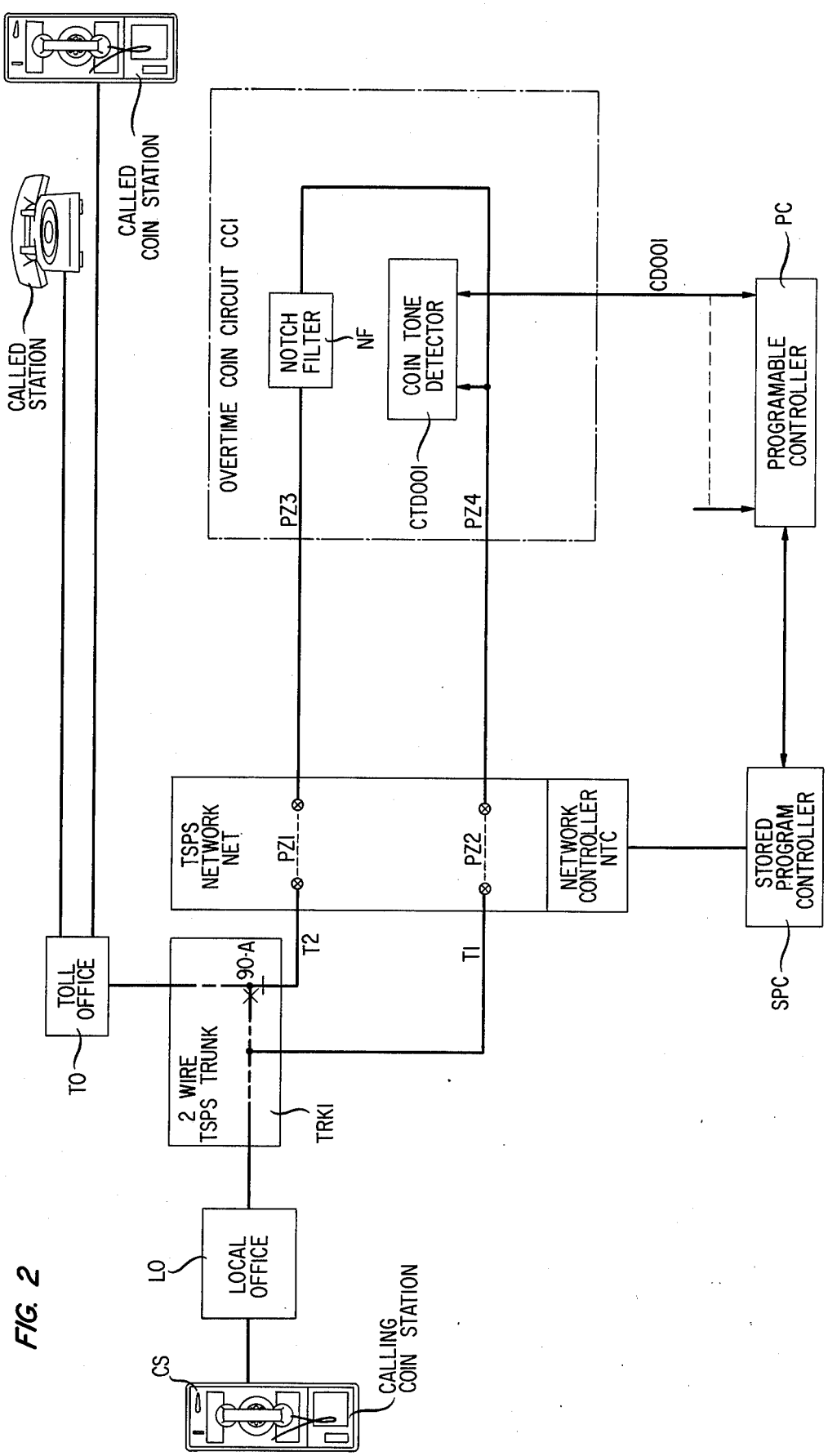
FIG. 2 illustrates one illustrative coin circuit and associated system operable in accordance with the principles of our invention.

FIG. 2 illustrates an improved coin circuit and associated system which is utilized during intermediate coin deposit detection periods in accordance with the principles of our invention. More specifically, during intermediate coin deposit periods, stored program controller SPC deactivates relay A (not shown) in trunk TRK1 to split the connection using contacts 90-A and also controls network controller NTC to establish network connections PZ1 and PZ2. Now the calling coin station and the called station (either a coin station or any other type of station) are further interconnected via leads PZ3, notch filter NF and leads PZ4. Coin deposit signals from the calling coin station are detected by coin tone detector CTD001 over path T1 and network connection PZ2. However, coin deposit signals emanating from the called station and received over leads T2 and network connection PZ1 are distorted by notch filter NF and accordingly are not detected by detector CTD001. To elaborate further, the attenuation introduced by notch filter NF is illustrated in FIG. 5. The 2200 Hz component of coin deposit signals is severely attenuated while the other frequencies such as the other coin deposit frequency of 1700 Hz pass through this filter.

Figure 3:
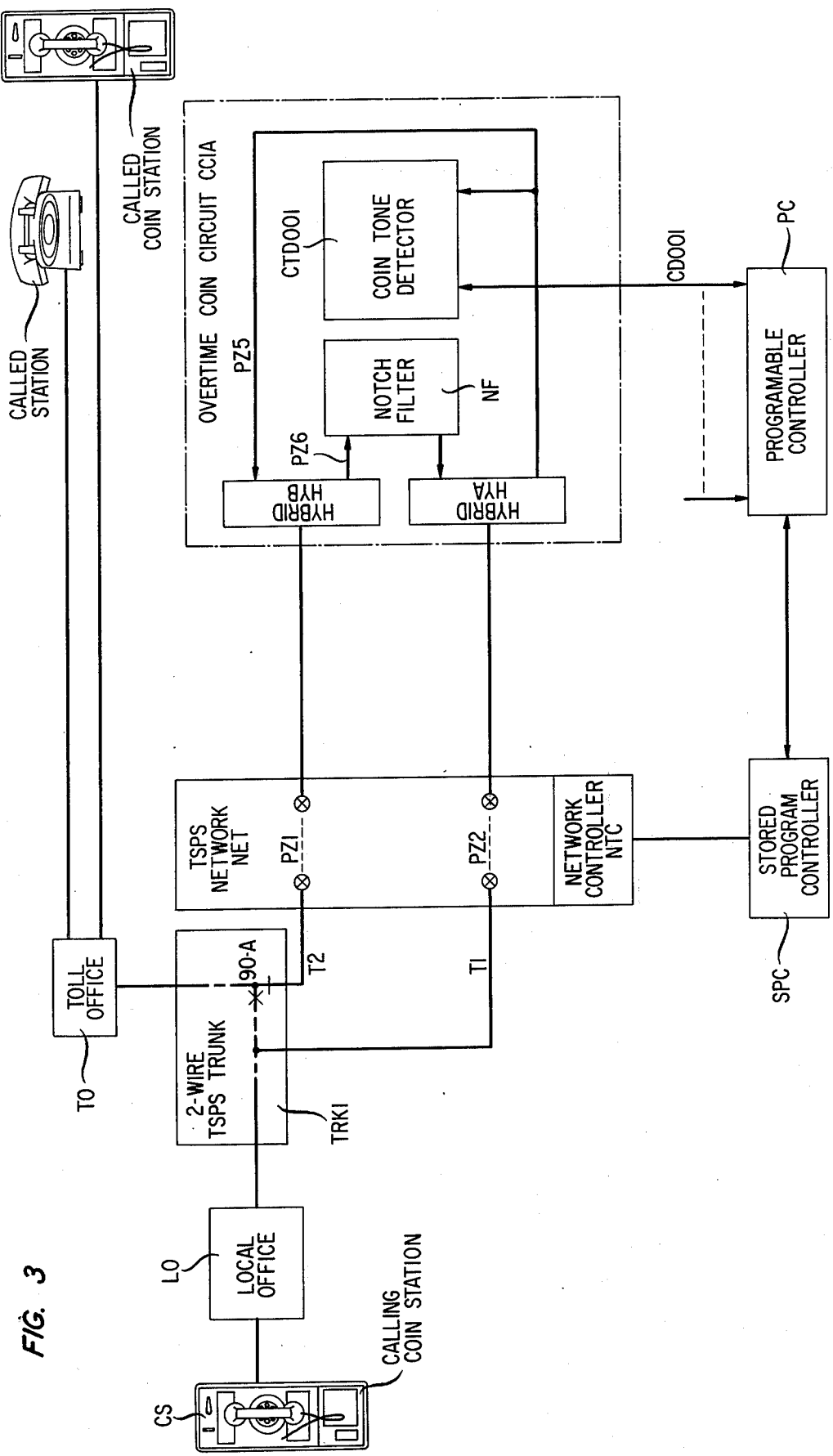
FIG. 3 illustrates another illustrative coin circuit operable in accordance with the principles of our invention.

FIG. 3 illustrates another illustrative embodiment of the invention. Overtime coin circuit CC1A further protects against called party fraud by utilizing hybrid circuits to provide separate transmission paths for a portion of the connection between the calling and called stations. More specifically, hybrid circuits HYB and HYA are utilized to provide two unidirectional paths designated PZ5 and PZ6. Path PZ5 carries signals from the calling station and path PZ6 carries signals from the called station. Notch filter NF is inserted in path PZ6 and attenuates the 2200 Hz component of signals from the called station. Since detector CTD001 is connected to path PZ5 there is even less likelihood that it will receive fraudulent coin deposit signals from the called station. Occasionally because of impedance mismatches in local office LO, signals from the called station will echo back to the detector and appear as though such signals actually originated at the calling station. However, since notch filter NF has attenuated one of the coin signal frequency components, such echoes will not be detected by detector CTD001.

FIG. 4 illustrates another illustrative embodiment of our invention beneficially incorporating the principles previously described in FIGS. 2 and 3. More specifically, a plurality of overtime coin circuits CC1B, for example, are terminated on the TSPS network previously described in FIG. 1. Coin circuits CDAM (disclosed in the above-mentioned Dudonis application) are also terminated on the TSPS network. These prior art coin circuits are still utilized for initial coin deposits because the called party is not then connected. However, for intermediate or overtime coin deposit periods, a coin circuit such as CC1B is utilized.

To elaborate, during intermediate coin deposit periods, stored program controller SPC controls network controller NTC to establish network connections P1B and P2B. The SPC informs programmable controller PC of the identity of the connected coin circuit and the required intermediate deposit. Then the SPC deactivates relay A in TSPS trunk TRK1 to return contacts 90-A to their normal position thereby splitting the connection between the calling and called stations. Trunk TRK1 is illustrated in FIG. 90 and 91 of the above-mentioned Jaeger patent and is described therein at columns 103 and 104. In these embodiments of our invention, the physical structure of this trunk is not changed. However, the order in which the relays are operated is changed to split the trunk during intermediate coin deposit intervals. More specifically, the trunk circuit now is controlled to undergo the following numerical states during the serving of a coin call with overtime: 0, 4, 6, 4, 5, 7, 5, 4, 5, 4, 6, 4. 0. The underlined states are added to the existing trunk operations. State 4 splits the trunk and state 5 is the talking or cut-through state. The meaning of these states is further described in the above-mentioned Jaeger patent.

The usual overtime announcement is sequentially retrieved from announcement store ASTR and applied via leads AN001 to announcement circuit ANM001. The announcement is applied via hybrid HY2 to lead LX1 of port 2 of the three-way bridge 3WB. This bridge circuit is adapted to apply signals received at any one of its three ports to corresponding leads in the other two ports. Thus, the announcement on lead LX1 is also applied to leads LX2 and LX3. Notch filter NF attenuates the 2200 Hz component of the announcement applied to the calling station.

The announcement on lead LX3 is applied by hybrid HY3 over network connection P2B, leads T2, contact 90-A to the called station, thus the called station hears the deposit announcement which indicates for example, "Please deposit X dollars and Y cents for the past Z minutes." The announcement on lead LX2 is also passed through notch filter NF, hybrid HY1, network connection P1B, leads T1 and local office L0 to the calling coin station. Responsive to this announcement, the calling subscriber should begin depositing coins in the calling coin station. Assuming the calling subscriber deposited a dime, two bursts of 1700 and 2200 hertz tones will be generated. These tones will be applied via leads T1 and network connection P1B to hybrid HY1. Hybrid HY1 then applies these coin tones to coin tone detector CTD001 via lead RX1. This detector should detect that a dime has been deposited in the normal manner.

If simulated coin deposit signals (fraudulent) had been generated at the called station either by depositing coins therein or by acoustically coupling tape recorded signals, then such fraudulent tones would be received by coin circuit CC1B via the following path: toll office TO, leads T2, network connection P2B, hybrid HY3, leads RX2 and three-way bridge 3WB. The bridge would further apply these signals to leads RX3 and LX2. The fraudulent coin deposit signals on lead LX2 are severely distorted by notch filter NF and output by hybrid HY1 over network connection P1B and leads T1 to local office LO.

Sometimes there is an impedance mismatch between the various connections between the calling coin station, the local office and the TSPS trunk. These mismatches cause certain portions of signals applied in one direction to be reflected back in the other direction. Thus, the distorted coin signal may be reflected back from local office LO toward the TSPS. These signals would then be applied to coin tone detection CTD001 and would appear to the system as though they had been developed at the calling coin station. However, since the coin deposit signals were severely distorted by notch filter NF, these signals would not be detected as valid coin deposit signals. Therefore, this beneficially prevents the called station from deriving free telephone service.

In other embodiments of our invention, it is anticipated that a notch filter may be placed in other portions of the connections established to the called station. For example, notch filter NF1 would serve almost the same function if inserted in lead RX2 in coin circuit CC1B instead of in lead LX2. This filter can also be inserted in network connector P2B in the TSPS network. In this one illustrative embodiment of our invention, the notch filter has been situated so that it also attenuates signals from the announcement circuit and possibly from operator's position POS. Thus, announcements reflected back from local office LO or trunk TRK1 line do not inadvertently trip detector CTD001.

Thus, in embodiments of our invention, a notch filter is inserted in the return path to the calling station so that it can attenuate signals from the called station, the announcement circuit and an operator's position. Thus, for initial coin deposits, previously described prior art coin circuit CDAM001 is completely acceptable for detecting coin deposits from the calling coin station. However, any time coin deposit detection is required after the network connection has been established between the calling station and the called station, overtime coin circuit CC1B in FIG. 4 can be utilized to beneficially prevent called station generated coin deposit signals from fraudulently appearing as valid coin deposit signals from the calling coin station.

THREE-WAY BRIDGE - 3WB

Figure 6:
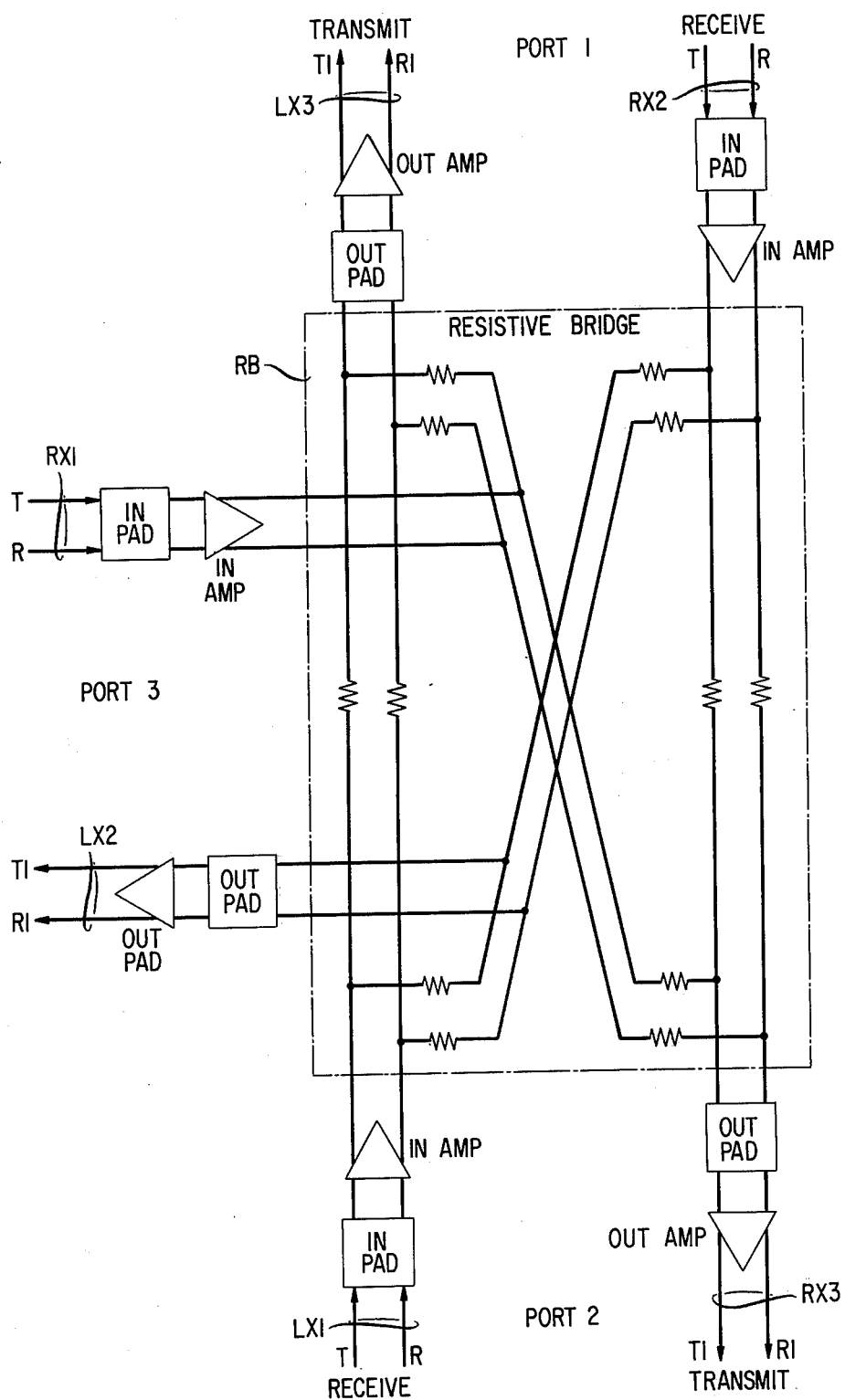
FIG. 6 illustrates the elements in the three-way bridge in FIG. 4.

FIG. 6 illustrates the major structural elements in three-way bridge 3WB. Each of the three ports includes two unidirectional paths. For example, port 1 includes unidirectional paths RX2 and LX3. Signals applied to resistive bridge RB via path RX2 are first attenuated by a fixed pad PD1 and then amplified by variable gain amplifier AMPL1. As hereinafter described, the signals received over path RX2 are applied to path RX3 and path LX2. The signals received over path RX2 are also applied to the incoming paths LX1 and RX1 at ports 2 and 3. However, these signals are severely attenuated and can be disregarded. Signals received over path LX1 of port 2 are applied to path LX3 of port 1 and LX2 of port 3 in a similar manner. Thus, signals input at one port are output at output leads each of the other two ports.

A SUMMARY OF THE INVENTION

It is apparent from the foregoing description that by splitting the connection into a calling and a called portion and by connecting these portions to one of overtime coin circuits previously described in regard to FIGS. 2, 3 and 4, coin calls can be serviced on an automated basis during intermediate coin deposit intervals while beneficially preventing called party fraud. The circuit includes a notch filter for attenuating fraudulent coin deposit signals originating at the called station thereby protecting the coin deposit detectors from fraudulent coin deposit signals.

Although the invention and the numerous features thereof have been described in connection with particular embodiments for detecting coin deposit tones, it is to be understood that additional applications and embodiments which will be obvious to those skilled in the art are included within the spirit and scope of the invention. Thus, this invention is applicable to all detection applications in which particular signals should be received from one station but may be fraudulently received from another station over an already established communication path.

What is claimed is:

1. Apparatus for preventing called party fraud in a coin station originated call wherein a connection is established between the calling coin station and a called station, which comprises
   means for splitting the connection into a calling station portion and a called station portion,
   a filter attenuating a frequency component in signals indicative of coin deposits,
   a coin tone detector detecting signals indicative of coin deposits, and
   extending means for extending said calling station portion to said coin tone detector and for extending said called station portion to said filter,
   said extended called station portion being connected via said filter to said extended calling station portion to reconnect said calling and called stations.

2. The apparatus according to claim 1 wherein said splitting means comprises relay means in a trunk circuit and wherein said extending means comprises a network controllable to establish a first network connection between said called station portion and said filter and to establish a second network connection between said calling station portion and said coin tone detector.

3. The apparatus according to claim 2 further comprising
   means for controlling said network to establish said first and second network connections at the start of a coin deposit interval.

4. The apparatus according to claim 1 wherein said signals indicative of coin deposits comprise bursts of two different frequency tones and wherein said filter attenuates all signals applied thereto having a frequency equal to one of said different frequency tones.

5. Apparatus for preventing called party fraud in a coin station originated call wherein a connection is established between the calling station and a called station, which comprises
   means for splitting the connection and forming a calling station portion and a called station portion,
   a filter in said called station portion for attenuating a frequency component in signals indicative of coin deposits, and
   a coin tone detector connected to said calling station portion for detecting signals indicative of coin deposits,
   said called station portion being connected to said calling station portion via said filter.

6. The apparatus according to claim 5 further comprising
   means for controlling said splitting means to split said trunk at the beginning of an interval in which coins are to be deposited in the calling coin station.

7. The apparatus according to claim 5 wherein said signals indicative of coin deposit comprise bursts of two different frequency tones and wherein said filter attenuates all signals having the same frequency as that of one of said different frequency tones.

8. Apparatus for preventing called party fraud in a coin station originated call wherein the calling and called stations are originally interconnected in a trunk circuit, which comprises
   means in the trunk circuit for splitting the station interconnection and forming a calling station portion and a called station portion,
   a network terminating both portions,
   a filter having first and second terminations on said network and attenuating a frequency component in signals indicative of coin deposits,
   a controller controlling said network to establish a first network connection between said calling station portion and the first termination of said filter, and a second network connection between said called station portion and the second termination of said filter, and
   a coin tone detector, connected to the path from said filter to said first termination, for detecting coin deposit tones received thereat from said calling station portion via said first network connection,
   whereby said filter attenuates said frequency component of signals received from said called station portion and thereby prevents said coin tone detector from detecting coin deposit tones received via said called station portion and second network connection.

9. The apparatus according to claim 8 further comprising stored program control means for causing said splitting means to split said interconnection at the start of a coin collection period.

10. In combination,
    means for splitting a call connection between a calling coin station and a called station into a calling station portion and a called station portion,
    first and second hybrid circuits,
    a network controllable to extend said calling station portion to said first hybrid circuit and to extend said called station portion to said second hybrid circuit,
    said hybrid circuits being interconnected by first and second unidirectional paths, said first unidirectional path applying signals received at said first hybrid circuit from said calling station portion to said second hybrid circuit, and said second unidirectional path applying signals received at said second hybrid circuit from said called station portion to said first hybrid, a notch filter in said second unidirectional path and attenuating signals at a predetermined coin deposit frequency, and a coin tone detector connected to said first unidirectional path and detecting signals representative of the deposit of coins.

11. The combination according to claim 10 further comprising stored program control means for controlling said splitting means to split said connection and for controlling said network to extend said portions during a coin detection period.

12. In combination, a trunk circuit controllable to split a call connection between a calling coin station and a called station into a calling station portion and a called station portion, first and second hybrid circuits, extending means including a network for extending said calling station portion to said first hybrid circuit and for extending said called station portion to said second hybrid circuit, a third hybrid circuit connected to an announcement circuit generating voice announcements, a three-way bridge circuit interconnecting said first, second and third hybrid circuits by first and second unidirectional paths between said bridge circuit and said second hybrid circuit, by third and fourth unidirectional paths between said bridge circuit and said first hybrid circuit, and by a pair of unidirectional paths between said bridge circuit and said third hybrid circuit, said third unidirectional path applying signals received by said bridge to said first hybrid circuit and said fourth unidirectional path applying signals received by said first hybrid circuit from said calling station portion to said bridge, a coin tone detector connected to said fourth unidirectional path for detecting signals representative of the deposit of coins, and a notch filter in one of said unidirectional paths and attenuatiing a particular frequency component in said signals representative of the deposit of coins.

13. The combination according to claim 12 further comprising stored program control means for controlling said trunk circuit to split the connection during a coin deposit interval and for controlling said extending means to extend said portions during the coin deposit interval.

14. For use in a system including a trunk circuit interconnecting a calling coin station and a called station, said circuit including means for splitting said interconnection and into a calling station portion and a called station portion, a network connected to both said calling station portion and said called station portion, a coin detection and called station fraud prevention circuit comprising a notch filter having first and second terminations on said network and attenuating a frequency component in coin deposit signals indicative of the deposit of coins in a coin station, a coin tone detector connected to said first termination and detecting coin deposit signals, and means for controlling said network to connect said called station portion to said second termination and to connect said calling station portion to said first termination.

15. For use in a system including a trunk circuit interconnecting a calling coin station and a called station, said circuit including means for splitting said interconnection into a calling station portion and a called station portion, a network connected to both said calling station portion and said called station portion, a coin detection and called station fraud prevention circuit comprising a first hybrid circuit having a termination on said network, a second hybrid circuit having a termination on said network, said hybrid circuits being interconnected by first and second unidirectional paths, said first path carrying signals from said first hybrid circuit to said second hybrid circuit, and said second path carrying signals from said second hybrid circuit to said first hybrid circuit, a notch filter in said first path and attenuating a frequency component in coin deposit signals indicative of the deposit of coins in a coin station, a coin tone detector connected to said second path and detecting coin deposit signals, and means for controlling said network to connect said called station portion to the termination of said first hybrid circuit and to connect said calling station portion to the termination of said second hybrid circuit.

16. In a system wherein first and second stations are interconnected by a transmission path and communicate thereover, and wherein specific signals are normally received from the first station by a receiving system, a signal detection and fraud prevention system in the receiving system comprising means for splitting the transmission path into a first portion connected to the first station and into a second portion connected to the second station, distorting means for distorting the specific signals, signal detection means for detecting the specific signals, and extending means for extending the first portion to said signal detection means and for extending the second portion to said distorting means, the extended first portion being connected to the extended second portion via said distorting means, whereby specific signals received over the first portion are detected by said signal detection means and specific signals received over the second portion are distorted and such distorted signals are not detected by said signal detection means.

* * * * *

UNITED STATES PATENT AND TRADEMARK OFFICE
CERTIFICATE OF CORRECTION

PATENT NO. : 4,031,325

DATED : June 21, 1977

INVENTOR(S) : Ronald M. Dudonis, Charles G. Morrison, Robert L. Potter and Kenneth Streisand It is certified that error appears in the above-identified patent and that said Letters Patent are hereby corrected as shown below:

Column 3, line 65, "eah" should be --each--. Column 6, line 45, after "CS001," the word --path-- should be inserted.

Signed and Sealed this

Twentieth Day of September 1977

[SEAL]

Attest:

RUTH C. MASON
Attesting Officer

LUTRELLE F. PARKER
Acting Commissioner of Patents and Trademarks